United States Patent
Ma et al.

(10) Patent No.: US 9,959,652 B2
(45) Date of Patent: May 1, 2018

(54) DISPLAY METHOD AND TERMINAL

(71) Applicant: Yulong Computer Telecommunication Scientific (Shenzhen) Co., Ltd., Shenzhen, Guangdong (CN)

(72) Inventors: Xiaoyan Ma, Guangdong (CN); Xinfeng Zhang, Guangdong (CN)

(73) Assignee: Yulong Computer Telecommunication Scientific (Shenzhen) Co., Ltd., Shenzhen, Guangdong (CN)

(*) Notice: Subject to any disclaimer, the term of this patent is extended or adjusted under 35 U.S.C. 154(b) by 80 days.

(21) Appl. No.: 15/196,286

(22) Filed: Jun. 29, 2016

(65) Prior Publication Data

US 2016/0307352 A1  Oct. 20, 2016

Related U.S. Application Data

(63) Continuation-in-part of application No. PCT/CN2013/091057, filed on Dec. 31, 2013.

(51) Int. Cl.
*G06T 11/60* (2006.01)
*H04N 5/445* (2011.01)
(Continued)

(52) U.S. Cl.
CPC ............ *G06T 11/60* (2013.01); *G06K 9/6215* (2013.01); *G06T 1/60* (2013.01); *G06T 3/40* (2013.01);
(Continued)

(58) Field of Classification Search
CPC ........ G06F 2203/04803; G06F 3/0481; G06K 9/6215; G09G 2340/12; G09G 2340/14; G09G 5/377; G09G 5/38; H04N 21/41407; H04N 21/4314; H04N 21/4316; H04N 21/4438; H04N 21/4782; H04N 21/482; H04N 21/4858; H04N 5/445

See application file for complete search history.

(56) References Cited

U.S. PATENT DOCUMENTS

| 8,359,541 | B1* | 1/2013 | Landry | G06F 3/0481 |
| | | | | 345/620 |
| 2008/0094421 | A1* | 4/2008 | Maeda | G06F 3/0481 |
| | | | | 345/661 |

(Continued)

FOREIGN PATENT DOCUMENTS

| CN | 1739086 A | 2/2006 |
| CN | 103020173 A | 4/2013 |

(Continued)

*Primary Examiner* — Sultana M Zalalee
(74) *Attorney, Agent, or Firm* — Young Basile Hanlon & MacFarlane, P.C.

(57) ABSTRACT

The present disclosure provides a display method and a terminal. The display method comprises: identifying a background picture on a screen interface of a terminal; and when the background picture comprises a preset object, ensuring that there is no display content shielding a display region of the preset object on the screen interface. By using the technical solution of the present disclosure, it is avoided that display content on a terminal shields a preset object on a background picture, so that the preset object can be fully displayed, which helps to improve use experience of a user.

20 Claims, 15 Drawing Sheets

(51) Int. Cl.
*H04N 21/414* (2011.01)
*H04N 21/431* (2011.01)
*H04N 21/443* (2011.01)
*H04N 21/4782* (2011.01)
*H04N 21/482* (2011.01)
*H04N 21/485* (2011.01)
*G06K 9/62* (2006.01)
*G06T 1/60* (2006.01)
*G06T 3/40* (2006.01)
*G09G 5/377* (2006.01)
*G09G 5/38* (2006.01)

(52) U.S. Cl.
CPC ............... *G09G 5/377* (2013.01); *G09G 5/38* (2013.01); *H04N 5/445* (2013.01); *H04N 21/41407* (2013.01); *H04N 21/4314* (2013.01); *H04N 21/4316* (2013.01); *H04N 21/4438* (2013.01); *H04N 21/4782* (2013.01); *H04N 21/482* (2013.01); *H04N 21/4858* (2013.01); *G09G 2340/12* (2013.01); *G09G 2340/14* (2013.01)

(56) References Cited

U.S. PATENT DOCUMENTS

| | | | | |
|---|---|---|---|---|
| 2009/0148146 | A1* | 6/2009 | Maeda | G02B 7/38 396/89 |
| 2010/0058230 | A1* | 3/2010 | Shing | G06F 9/4443 715/788 |
| 2010/0245130 | A1* | 9/2010 | Stoll | B64D 11/0015 340/945 |
| 2013/0117697 | A1* | 5/2013 | Lu | G06F 3/0482 715/765 |
| 2013/0268563 | A1* | 10/2013 | Shiell | G06F 17/30 707/797 |
| 2014/0232739 | A1* | 8/2014 | Kim | G09G 5/14 345/592 |

FOREIGN PATENT DOCUMENTS

CN 103337086 A 10/2013
JP 2006133873 A * 5/2006

\* cited by examiner

DISPLAY METHOD AND TERMINAL

CROSS-REFERENCE TO RELATED APPLICATIONS

This application is a continuation in part of application PCT/CN2013/091057, by YULONG COMPUTER TELECOMMUNICATION SCIENTIFIC (SHENZHEN) CO., LTD., filed on Dec. 31, 2013, and entitled DISPLAY METHOD AND TERMINAL, the disclosure of which is herein incorporated by reference in its entirety.

TECHNICAL FIELD

The present disclosure relates to communication field, and particularly to a display method and a terminal.

BACKGROUND

The rapid progress of terminal technology, such as mobile terminals (such as smart phones, tablet computers, and laptops) and fixed terminals (such as desktop computers), has allowed the manufacturer to preset pictures as the display background (such as desktop wallpaper) of the terminal in order to make the displayed screen more vivid and interesting. On the other hand, currently, as to the preset pictures, the number is relatively small and the type is very limited, and as a result, more and more terminals have allowed the user to set the pictures as the display background manually.

In smart phones, for example, the user can set desktop wallpapers as the background picture of a standby interface, and can also set lock-screen wallpapers as the background picture of a lock-screen interface, etc.

However, in the terminal, not only the above-mentioned pictures but also other contents are displayed. That is to say, the pictures are just "background" on the screen of the terminal, above which other contents (such as application icons, widgets, and the like) are also displayed. The contents tend to cause background picture shielding and incomplete display. Sometimes, due to the display positions of the contents on the screen, the characters or scenery comprised in the background picture that the user want to view may be blocked and only insignificant parts are viewable.

To this end, how to reasonably arrange the display content on the screen of the terminal so as to avoid shielding of the interested parts of the background picture has become a technical problem to be solved at present.

SUMMARY

Taking into consideration the above-mentioned issues, the present disclosure provides a new display technology, which can avoid a preset object on a background picture from being shielded by the display content(s) on the screen of a terminal, so that the preset object can be fully displayed, which helps to improve user experience.

In view of this, the present disclosure provides a display method, which comprises: identifying a background picture on a screen interface of a terminal; and when the background picture comprises a preset object, ensuring that there is no display content shielding a display region of the preset object on the screen interface.

In this technical solution, by identifying whether the background picture comprises the preset object, the display position adjustment of the display content on the screen interface can only be performed when the preset object is comprised in the background picture, whereby reducing the number of display position adjustment as much as possible, which helps to reduce the power consumption of the terminal and save the processing resources.

If the background picture comprises the preset object, the position of the display content on the screen interface will be controlled or adjusted, such that the display region of the preset object will not be shielded and the preset object can be fully displayed on the screen interface, which helps to improve user experience.

Wherein, the preset object can be preset by the manufacturer or set by the user, and can be any display content (such as characters, scenery, text, and the like) of interest to the user in the background picture. On the other hand, there can be a lot of display contents (such as application icons, widgets, window-based application interface, and the like) which may shield the preset object. In fact, any display content could shield the background picture and the position thereof can be adjusted by the terminal to avoid such shielding.

As one preferred implementation, the method further comprises: pre-storing a standard image of the preset object in the terminal. The process of identifying the background picture comprises: taking an object comprised in the background picture as the preset object if it matches the standard image.

In the above-mentioned technical solution, by pre-storing the standard image of the preset object (such as the standard images of faces, trees, houses, and the like) in the terminal, the terminal can use the standard image to match the background picture by itself, and the object matched successfully in the background picture will be the preset object.

As another preferred implementation, the process of identifying the background picture comprises: acquiring the pre-stored characteristic parameter information of the preset object; and taking an object comprised in the background picture as the preset object if it matches the characteristic parameter information.

In the above-mentioned technical solution, the same kinds of objects may have the same characteristics, and the characteristic parameter information therefore refers to the corresponding characteristics of the preset object. For example, for "face", the characteristic parameter information may include: eye, nose, mouth, and the like, and the respective shape, color, size, location, and other information thereof.

Compared with the manner of storing the standard image directly, through the characteristic parameter information, the terminal can not only identify the same image as the standard image but also "learn" and "recognize" all the objects which have the above-mentioned characteristic parameter information. Still take "face" as an example, all faces, instead of a certain face, will be identified via the characteristic parameter information.

Of course, the characteristic parameter information can be applied to all kinds of preset objects, such as faces, scenery, and the like. The characteristic parameter information can be entered into the terminal directly by the user or the manufacturer; or, the image information of a specific preset object can be entered into the terminal, such that the terminal can summarize and store the corresponding characteristic parameter information via automatic "learning" of the image information. During the process of automatic "learning", the more the image information of the preset object pre-entered, the more accurate the characteristic parameter information will be summarized.

A person skilled in the art will understand that, there are many other ways to identify the preset object and therefore the above-mentioned technical solution is by no means for specific restrictions. In some cases, the user can select a region(s) of the background picture directly, and the region selected will be the preset object.

Preferably, in the above-mentioned technical solution, if the preset object is comprised in the background picture and is shielded by the display content, the process of ensuring that there is no shielding comprises: moving the display content out of the display region.

In the technical solution, in the situation where the number of application icons or the background picture in the terminal changes, if the preset object is comprised in the background picture and is shielded by the display content on the screen interface, the shielding caused by the display content will be eliminated by moving it out of the display region of the preset object.

As one preferred implementation, if there is any blank region which is big enough for the display content other than the display region on the screen interface, the process of moving the display content out of the display region comprises: moving the display content to the blank region.

As another preferred implementation, if there is no blank region other than the display region on the screen interface, the process of moving the display content out of the display region comprises: moving the display content to a specific folder already established on the screen interface; or, moving the display content to other terminal interfaces of the terminal.

As another preferred implementation, if the blank region is not big enough for all of the display content, the process of moving the display content out of the display region comprises: moving the display content to other terminal interfaces of the terminal; or, moving the display content to a specific folder already established on the screen interface; or, moving a part of the display content to the blank region, and moving the remain display content to other terminal interfaces of the terminal, the specific folder already established on the screen interface, and/or a new folder on the screen interface.

As another preferred implementation, if the blank region is not big enough for all of the display content and a combined region consists of the blank region and an occupied region of other display content in the vicinity of the blank region is big enough for all of the display content, the process of moving the display content out of the display region comprises: exchanging the display positions of the display content and the other display content, such that the display content is displayed in the combined region, and the other display content will not shield the display region.

In the above-mentioned technical solution, "blank region" refers to regions other than the display region of the preset object, in which there is no other display content except the background picture. The method for moving the display content out of the display region can be determined according to the use of terminal interfaces and personal habits of the user. More specifically, by moving the display content to the blank region or the already established specific folder or the new folder, or, moving the display content directly to other terminal interfaces, the preset object can be fully displayed and the shielding thereof can be eliminated.

In the above-mentioned technical solution, preferably, if the preset object is comprised in the background picture and is shielded by the display content, the process of ensuring that there is no shielding comprises: adjusting the size and/or display mode of the display content.

In this technical solution, in some situations, such as where the preset object is shielded by a part of the display content, the shielding can be eliminated by adjusting the size of the display content. To be specific, the size proportion of the display content can be changed, for example, an icon of 2*2 can be changed to a small icon of 1*1 for displaying.

At the same time, the change of the display mode of the display content includes but is not limited to: the adjustment of the position, sequence, and the like of the individual elements contained in the display content, or, the adjustment of the arranging direction of the display content; for example, adjusting the display mode of "Time" in a lock-screen state from "Horizontal display" to "Vertical display".

In the above-mentioned technical solution, preferably, if the preset object is comprised in the background picture and is shielded by the display content, the process of ensuring that there is no shielding comprises: adjusting the display properties of the background picture.

It can be seen that, in this technical solution, if the preset object is shielded by the display content, the shielding can also be eliminated by adjusting the display properties of the background picture. Wherein the display properties of the background picture can be any of: display proportion, the relative position relationship between the background picture and the screen interface, arranging mode, and the like. The adjustment of the display properties of the background picture includes but is not limited to: scaling, moving, cropping, rotating, and the like.

In the above-mentioned technical solution, preferably, the display region comprises a high priority region and a low priority region; and the process of adjusting the display properties of the background picture comprises: setting the low priority region as a blank region, such that all of the blank regions will be enough for the display content after setting.

In this technical solution, by dividing the display region of the preset object into the high priority region and the low priority region and setting the latter as the blank region, in the situation where the display positions on the screen interface are limited and it is undesirable to move the display content to other interfaces, the area of "blank region" can be expanded to hold more display contents so as to avoid too much changes to the display content.

According to another aspect of the disclosure, it is provided a terminal, which comprises: a picture identifying unit, configured to identify a background picture on a screen interface of a terminal so as to determine whether the background picture comprises a preset object; and a display controlling unit, configured to ensure that there is no display content shielding a display region of the preset object on the screen interface if the background picture comprises the preset object.

In this technical solution, by identifying whether the background picture comprises the preset object, the display position adjustment of the display content on the screen interface can only be performed when the preset object is comprised in the background picture, whereby reducing the number of display position adjustment as much as possible, which helps to reduce the power consumption of the terminal and save the processing resources.

If the background picture comprises the preset object, the position of the display content on the screen interface will be controlled or adjusted, such that the display region of the preset object will not be shielded and the preset object can be fully displayed on the screen interface, which helps to improve user experience.

Wherein, the preset object can be preset by the manufacturer or set by the user, and can be any display content (such as characters, scenery, text, and the like) of interest to the user in the background picture. On the other hand, there can be a lot of display content (such as application icons, widgets, window-based application interface, and the like) which may shield the preset object. In fact, any display content could shield the background picture and the position thereof can be adjusted by the terminal to avoid such shielding.

As one preferred implementation, the terminal further comprises: an image storing unit, configured to pre-store a standard image of the preset object; wherein the picture identifying unit is further configured to take an object comprised in the background picture as the preset object if it matches the standard image.

In the above-mentioned technical solution, by pre-storing the standard image of the preset object (such as the standard images of faces, trees, houses, and the like) in the terminal, the terminal can use the standard image to match the background picture by itself, and the object successfully matched in the background picture will be the preset object.

As another preferred implementation, the picture identifying unit is further configured to: acquire the pre-stored characteristic parameter information of the preset object, and take an object comprised in the background pictured as the preset object if it matches the characteristic parameter information.

In the above-mentioned technical solution, the same kinds of objects may have the same characteristics, and the characteristic parameter information therefore refers to the corresponding characteristics of the preset object. For example, for "face", the characteristic parameter information may include: eye, nose, mouth, and the like, and the respective shape, color, size, location, and other information thereof.

Compared with the manner of storing the standard image directly, through the characteristic parameter information, the terminal can not only identify the same image as the standard image but also "learn" and "recognize" all the objects which have the above-mentioned characteristic parameter information. Still take "face" as an example, all faces, instead of a certain face, will be identified via the characteristic parameter information.

Of course, the characteristic parameter information can be applied to all kinds of preset objects, such as faces, scenery, and the like. The characteristic parameter information can be entered into the terminal directly by the user or the manufacturer; or, the image information of a specific preset object can be entered into the terminal, such that the terminal can summarize and store the corresponding characteristic parameter information via automatic "learning" of the image information. During the process of automatic "learning", the more the image information of the preset object pre-entered, the more accurate the characteristic parameter information will be summarized.

A person skilled in the art will understand that, there are many other ways to identify the preset object and therefore the above-mentioned technical solution is by no means for specific restrictions. In some cases, the user can select a region(s) of the background picture, and the region selected will be the preset object.

Preferably, in the above-mentioned technical solution, the display controlling unit is configured to: if the preset object is comprised in the background picture and is shielded by the display content, move the display content out of the display region.

In the technical solution, in the situation where the number of application icons or the background picture in the terminal changes, if the preset object is comprised in the background picture and is shielded by the display content on the screen interface, the shielding caused by the display content will be eliminated by moving the latter out of the display region of the preset object.

In the above-mentioned technical solution, the display controlling unit is configured to: if there is any blank region which is big enough for the display content other than the display region on the screen interface, move the display content to the blank region; optionally, if there is no blank region other than the display region on the screen interface, move the display content to a specific folder already established on the screen interface or move the display content to other terminal interfaces of the terminal; optionally, if the blank region is not big enough for all of the display content, move the display content to other terminal interfaces of the terminal, or, move the display content to a specific folder already established on the screen interface, or, move a part of the display content to the blank region and move the remain display content to other terminal interfaces of the terminal, the specific folder already established on the screen interface, and/or a new folder on the screen interface.

The display controlling unit is further configured to: if the blank region is not big enough for all of the display content, and if a combined region consists of the blank region and a occupied region of other display content in the vicinity of the blank region is big enough for all of the display content, exchange the display positions of the display content and the other display content, such that the display content is displayed in the combined region, and the other display content will not shield the display region.

In the above-mentioned technical solution, "blank region" refers to regions other than the display region of the preset object, in which there is no other display content except the background picture. The method for moving the display content out of the display region can be determined according to the use of terminal interfaces and personal habits of the user. More specifically, by moving the display content to the blank region or the already established specific folder or the new folder, or, moving the display content directly to other terminal interfaces, the preset object can be fully displayed and the shielding thereof can be eliminated.

In the above-mentioned technical solution, preferably, the display controlling unit is configured to: if the preset object is comprised in the background picture and is shielded by the display content, adjust the size and/or display mode of the display content.

In this technical solution, in some situations, such as where the preset object is shielded by a part of the display content, the shielding can be eliminated by adjusting the size of the display content. To be specific, the size proportion of the display content can be changed, for example, an icon of 2*2 can be changed to a small icon of 1*1 for displaying.

At the same time, the change of the display mode of the display content includes but is not limited to: the adjustment of the position, sequence, and the like of the individual elements comprised in the display content, or, the adjustment of the arranging direction of the display content; for example, adjusting the display mode of "Time" in a lock-screen state from "Horizontal display" to "Vertical display".

In the above-mentioned technical solution, preferably, the display controlling unit is configured to: if the preset object is comprised in the background picture and is shielded by the display content, adjust the display properties of the background picture.

It can be seen that, in this technical solution, if the preset object is shielded by the display content, the shielding can also be eliminated by adjusting the display properties of the background picture. Wherein the display properties of the background picture can be any of: display proportion, the relative position relationship between the background picture and the screen interface, arranging mode, and the like. The adjustment of the display properties of the background picture includes but is not limited to: scaling, moving, cropping, rotating, and the like.

In the above-mentioned technical solution, preferably, the display region comprises a high priority region and a low priority region; and the display controlling unit is configured to: if the preset object is comprised in the background picture and is shielded by the display content, set the low priority region as a blank region, such that all of the blank regions will be enough for the display content after setting.

In this technical solution, by dividing the display region of the preset objects into the high priority region and the low priority region and setting the latter as the blank region, in the situation where the display positions on the screen interface are limited and it is undesirable to move the display content to other interfaces, the area of "blank region" can be expanded to hold more display contents so as to avoid too much changes to the display content.

Through the above-mentioned technical solution, a preset object in a background picture can be avoided from being shielded by the display content on the screen of a terminal, so that the preset object can be fully displayed, which helps to improve user experience.

In accordance with a further aspect of the disclosure, it is further provided a program product stored in a non-volatile machine readable medium for terminal control. The program product includes machine executable instructions, when executed by a computer system, causing the system to execute the following: identifying a background picture on a screen interface of a terminal; and when the background picture comprises a preset object, ensuring that there is no display content shielding a display region of the preset object on the screen interface.

In accordance with a further aspect of the disclosure, it is further provided a non-volatile machine readable medium storing a program product for terminal control. The program product includes machine executable instructions, when executed by a computer system (such as a system comprises a processor(s) and a memory), causing the system to execute the following: identifying a background picture on a screen interface of a terminal; and when the background picture comprises a preset object, ensuring that there is no display content shielding a display region of the preset object on the screen interface.

According to a further aspect of the disclosure, it is further provided a machine-readable program, configured to cause the machine to execute any of the display methods described in the abovementioned technical solutions.

According to a further aspect of the disclosure, it is further provided a storage medium storing a machine-readable program. The machine-readable program is configured to cause the machine to execute any of the display methods described in the abovementioned technical solutions.

DETAILED DESCRIPTION

In order to more clearly understand the above object, features, and advantages of the present disclosure, it will be described in further detail with refer to the accompanying drawings and the following implementations. It should be noted that, the implementations and the features thereof can be combined with each other without confliction.

In the following description, numerous specific details are set forth in order to fully understand the present disclosure, but the present disclosure can also be achieved in other ways different from the implementations described herein, therefore, the scope of the present disclosure is not limited to the following specific implementations.

Figure 1:
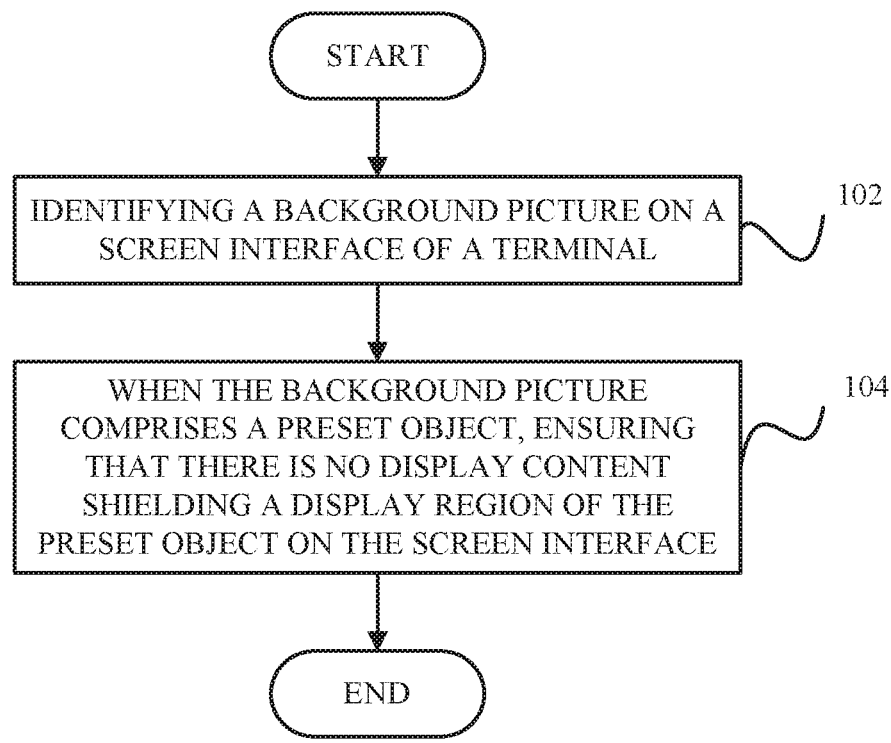
FIG. 1 a schematic flowchart illustrating a display method according to one implementation of the disclosure.

FIG. 1 a schematic flowchart illustrating a display method according to one implementation of the disclosure. As shown in FIG. 1, the display method according to the implementation of the disclosure comprises: Step 102, identifying a background picture on a screen interface of a terminal; and Step 104, when the background picture comprises a preset object, ensuring that there is no display content shielding a display region of the preset object on the screen interface.

In this technical solution, by identifying whether the background picture comprises the preset object, the display position adjustment of the display content on the screen interface can only be performed when the preset object is comprised in the background picture, whereby reducing the number of display position adjustment as much as possible, which helps to reduce the power consumption of the terminal and save the processing resources.

If the background picture comprises the preset object, the position of the display content on the screen interface will be controlled or adjusted, such that the display region of the preset object will not be shielded and the preset object can be fully displayed on the screen interface, which helps to improve user experience.

Wherein, the preset object can be preset by the manufacturer or set by the user, and can be any display content (such as characters, scenery, text, and the like) of interest to the user in the background picture. On the other hand, there can be a lot of display content (such as application icons, widgets, window-based application interface, and the like) which may shield the preset object. In fact, any display content could shield the background picture and the position thereof can be adjusted by the terminal to avoid such shielding.

Figure 2A:
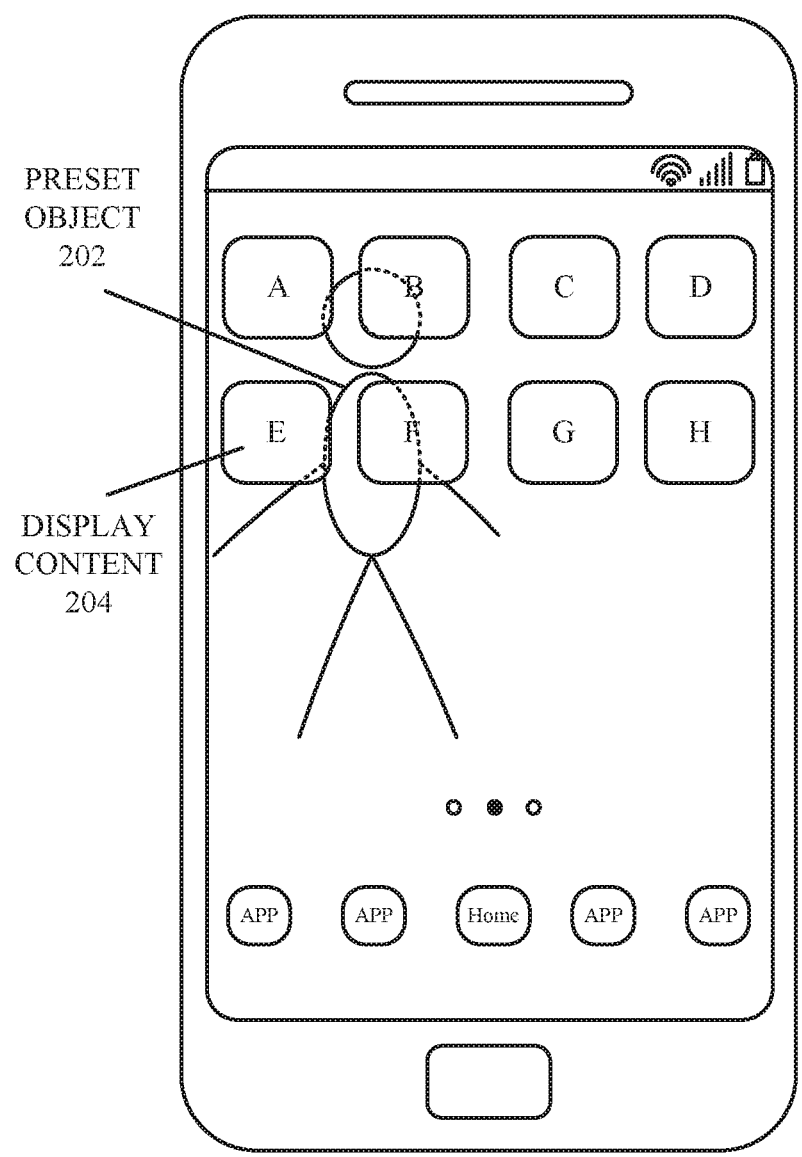
FIG. 2A-2K are interface sketches illustrating the scenarios of controlling terminal display according to the contents of a background picture according to one implementation of the disclosure.

As a specific application scenario, FIG. 2A illustrates a specific situation where a preset object 202 on the terminal is shielded by the display content 204; wherein the preset object 202 is a "character" image in the background picture and the display content 204 is an application icon on the screen interface of the terminal.

As can be seen from FIG. 2A, the face, body, or limbs of the preset object 202 are shielded by the display content 204 such as application icon A, application icon B, application icon E, application icon F, and the like, such that the user cannot view the preset object 202 clearly and completely, which affects the user experience.

Figure 2B:
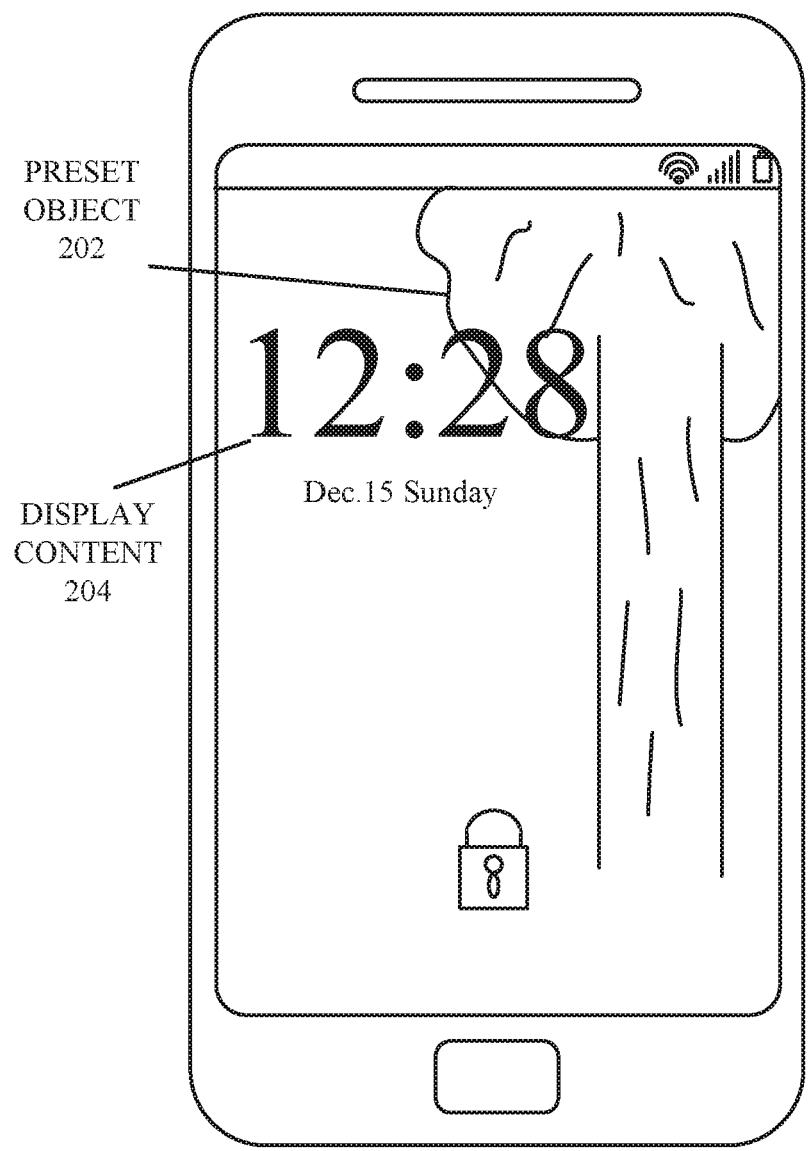

As another specific application scenario, FIG. 2B illustrates another specific situation where the preset object 202 on the terminal is shielded by display content 204; wherein the preset object 202 is a "plant" image in the background picture and the display content 204 is the "digital clock (can be a inner plug-in or a third party plug-in)" on the screen interface of the terminal.

As can be seen from FIG. 2B, the branches and leaves of the preset object 202 are shielded by the display content, i.e., the clock plug-in with "12:28", and as a result, the user cannot view the preset object 202 clearly and completely, which affects the user experience.

To overcome the shielding of the preset object 202 caused by the display content 204, the identification of the preset object and the elimination of the shielding of the preset object should be achieved, which will be described in detail below respectively.

I. Identification of the Preset Object

The terminal has to identify whether there is a preset object in the background picture at the first place, and then determine whether there is any display content shielding the preset object, so as to achieve corresponding display control.

Implementation 1

Preferably, a standard image of the preset object can be pre-stored in the terminal; and the process of identifying the background picture comprises: taking an object comprised in the background picture as the preset object if it matches the standard image.

In the above-mentioned technical solution, by pre-storing the standard image of the preset object (such as the standard images of faces, trees, and houses, and the like) in the terminal, the terminal can use the standard image to match the background picture by itself, and the object successfully matched in the background picture will be the preset object.

For example, as to the "character" as shown in FIG. 2A or the "plant" as shown in FIG. 2B, the image thereof can be pre-stored in the terminal, when a picture comprises the "character" or "plant" is used as the background picture, the terminal can identify the preset object accurately via comparison and matching between the background picture and the standard image.

However, in this way, there are some limitations. For example, as to "character", there are differences between different people; even for the same person, different molding in different pictures may not match the stored standard image. Therefore, the method based on the storage of the standard image tends to only applicable to the identification of same pictures.

Implementation 2

Another method for identifying the background picture is provided to eliminate the limitations of Implementation 1. The method comprises: acquiring the pre-stored characteristic parameter information of the preset object; and taking an object comprised in the background picture as the preset object if it matches the characteristic parameter information.

In the above-mentioned technical solution, the same kinds of objects may have the same characteristics, and the characteristic parameter information therefore refers to the corresponding characteristics of the preset object. For example, for "face", the characteristic parameter information may include: eye, nose, mouth, and the like, and the respective shape, color, size, location, and other information thereof.

Compared with the manner of storing the standard image directly, through the characteristic parameter information, the terminal can not only identify the same image as the standard image but also "learn" and "recognize" all the objects which have the above-mentioned characteristic parameter information. Still take "face" as an example, all faces, instead of a certain face, will be identified via the characteristic parameter information.

Of course, the characteristic parameter information can be applied to all kinds of preset objects, such as faces, scenery, and the like. The characteristic parameter information can be entered into the terminal directly by the user or the manufacturer; or, the image information of a specific preset object can be entered into the terminal, such that the terminal can summarize and store the corresponding characteristic parameter information via automatic "learning" of the image information. During the process of automatic "learning", the more the image information of the preset object pre-entered, the more accurate the characteristic parameter information will be summarized.

A person skilled in the art will understand that, there are many other ways to identify the preset object and Implementation 1 and Implementation 2 described above are by no means for specific restrictions. In some cases, the user can select a region(s) of the background picture directly, and the region selected will be the preset object (not shown in figures).

II. Elimination of the Shielding of the Preset Object

After the identification of the preset object, the shielding of the preset object can be eliminated through display control of the screen interface.

Implementation 1

Preferably, if the preset object is comprised in the background picture and is shielded by the display content, the process of ensuring that there is no shielding comprises: moving the display content out of the display region.

In the technical solution, in the situation where the number of application icons or the background picture in the terminal changes, if the preset object is comprised in the background picture and is shielded by the display content on the screen interface, the shielding caused by the display content will be eliminated by moving it out of the display region of the preset object.

As one preferred implementation, if there is any blank region which is big enough for the display content other than the display region on the screen interface, the process of moving the display content out of the display region comprises: moving the display content to the blank region.

Figure 2C:
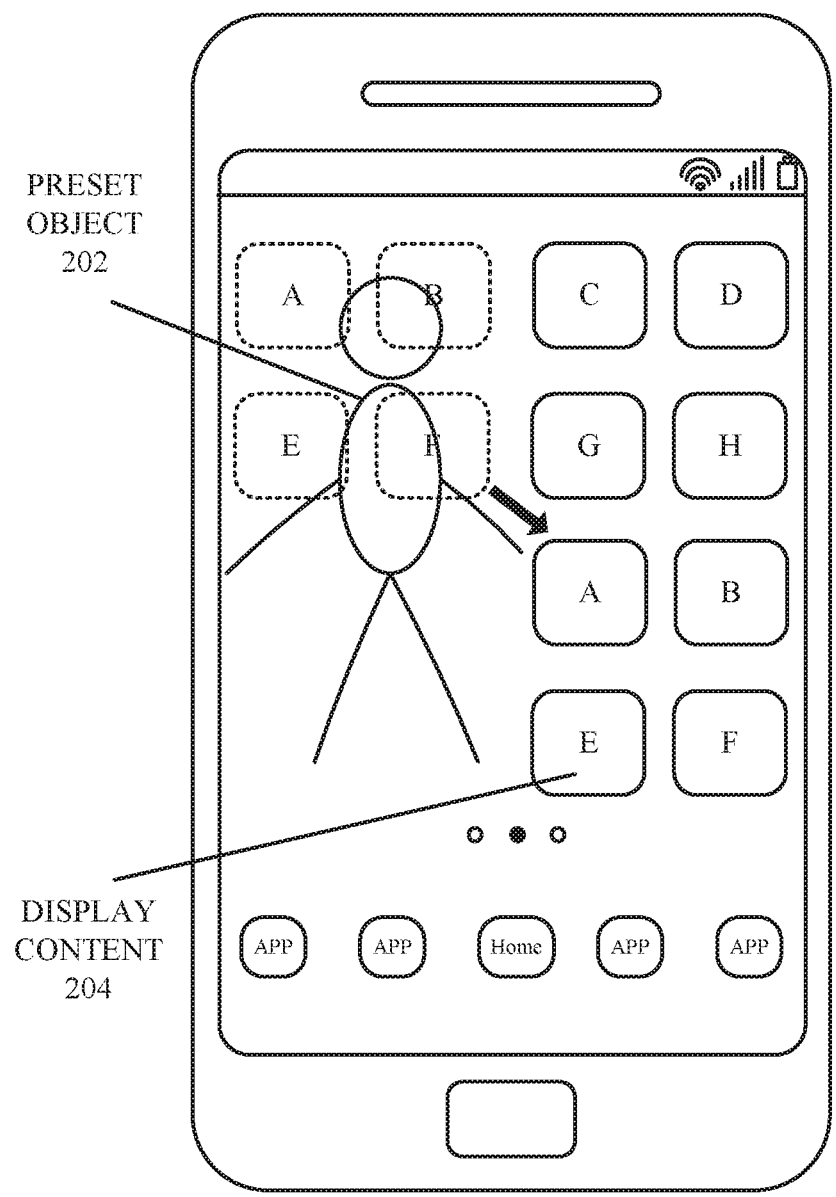

For example, as shown in FIG. 2C, the preset object 204 is shielded by the display content 204 such as application icon A and the like. There is no other application icon or widget in the lower right corner of the screen interface of the terminal and it is big enough for the display content 204, consequently, the display content 204 can be moved directly to the blank region.

Figure 2D:
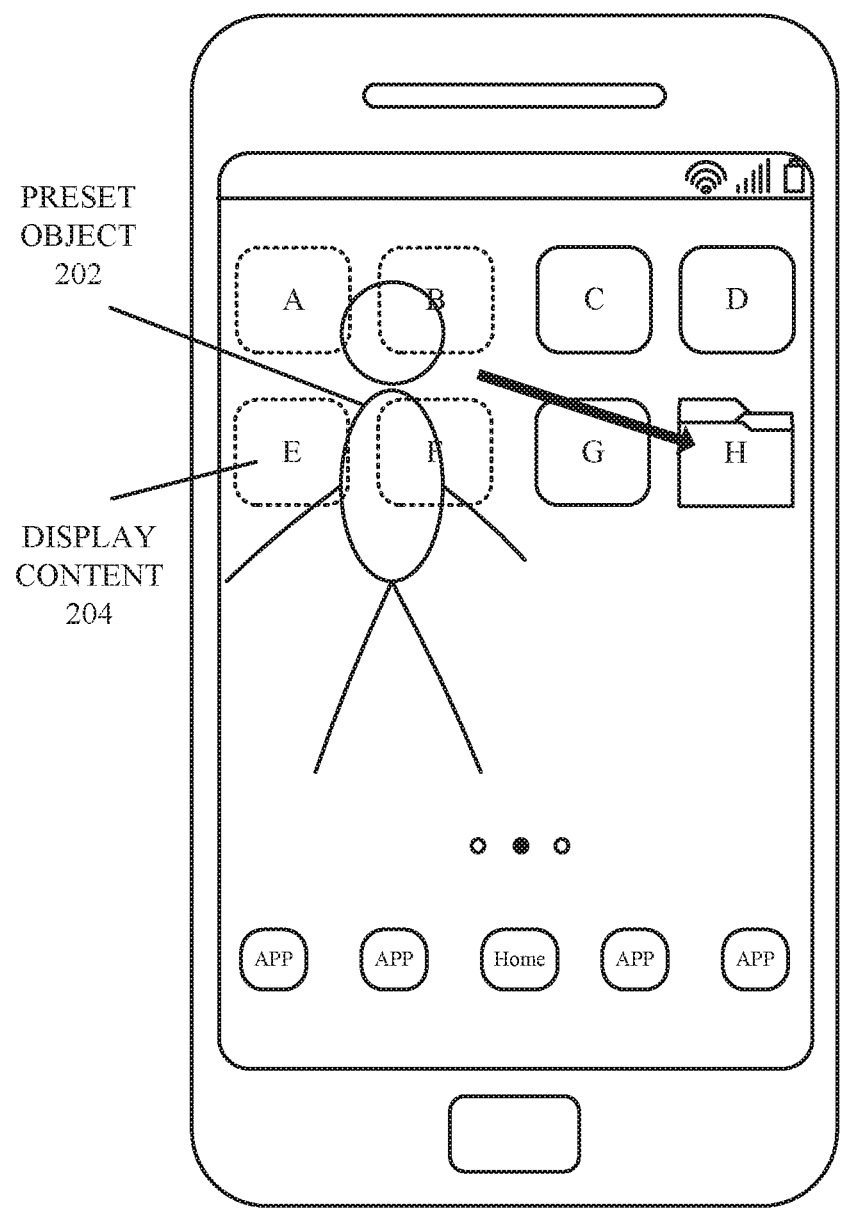

Without doubt, instead of occupying the blank region, the display content 204 can be moved into a certain folder so as to save display space of the screen interface. For example, as shown in FIG. 2D, the display content 204 (that is, the application icon A and the like) can be moved into folder H directly to eliminate the shielding of the preset object 202. Wherein folder H can be a folder already established on the screen interface or a new folder.

In fact, just like the case shown in FIG. 2D, even if there is a blank region which is big enough for the display content 204 on the screen interface of the terminal, the user can still move the display content 204 into a certain folder such as folder H according to actual needs. The common cases are the following Case (1)-Case (3).

Case (1): if there is no blank region other than the display region on the screen interface (it is supposed that there is no blank region in the lower right corner of the screen interface in FIG. 2D), the process of moving the display content out of the display region comprises: moving the display content to a specific folder (such as folder H) already established on the screen interface; or, moving the display content to other terminal interfaces (not shown in the figures) of the terminal.

Case (2): if the blank region is not big enough for all of the display content, the process of moving the display content out of the display region comprises: moving the display content to other terminal interfaces of the terminal; or, moving the display content to a specific folder already established on the screen interface; or, moving a part of the display content to the blank region, and moving the remain display content to other terminal interfaces of the terminal, the specific folder already established on the screen interface and/or a new folder on the screen interface.

Figure 2E:
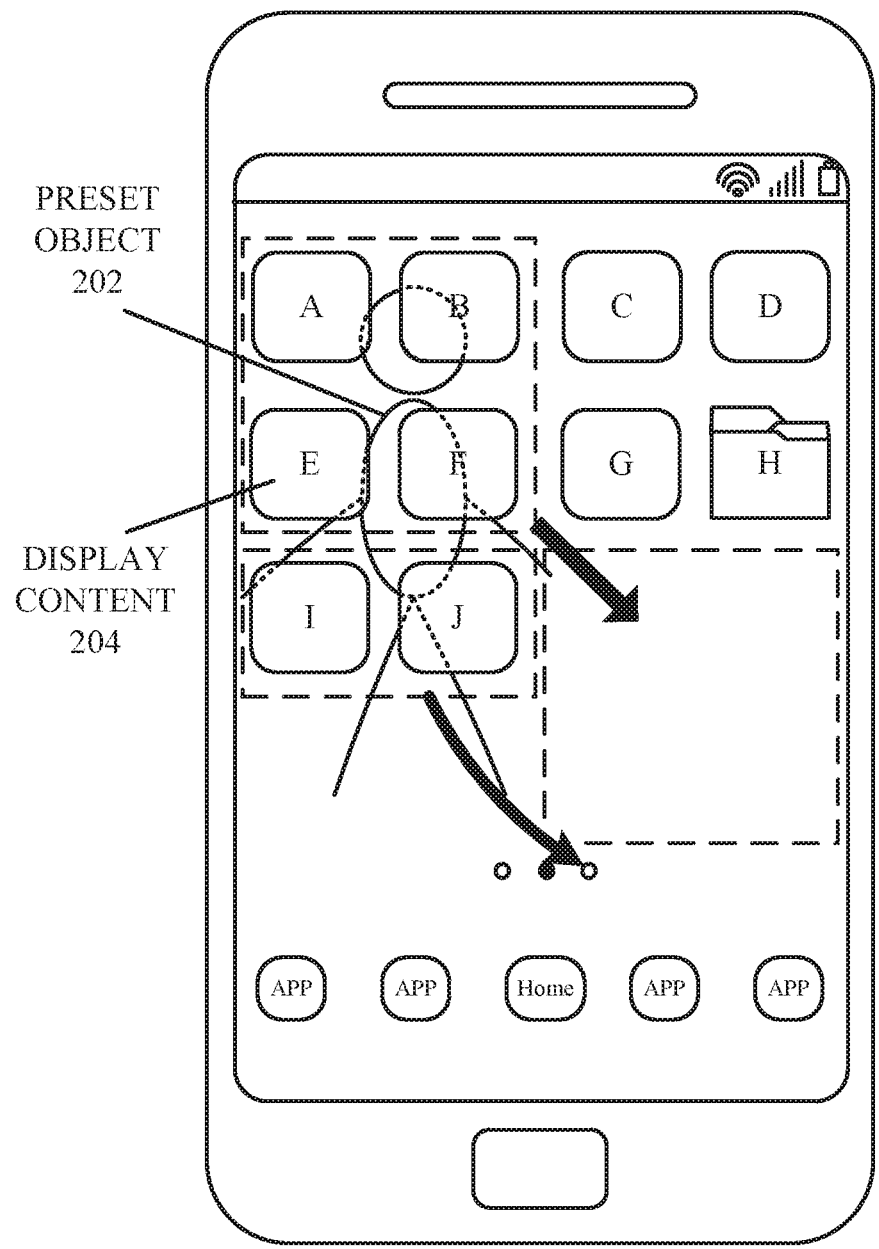

As to case 2), as shown in FIG. 2E, it is supposed that the display content 204 comprises application icon A, application icon B, application icon E, application icon F, application icon I, application icon J, and the like, and the blank region is able to hold four application icons only. As a preferred implementation, the display content 204 can be processed as a whole, such as moved into folder H or moved to a blank region or folder on another interface (not shown in figures) as a whole.

As another preferred implementation, the display content 204 can be divided into two parts, as to the part which can be moved to the blank region arbitrarily, it can be moved to the blank region or folder H, or moved to another blank region or folder in other interfaces; on the other hand, as to the part which cannot be moved to the blank region after the division, if any, it can be moved to folder H, or moved to another blank region or folder in other interfaces.

The number of parts that the display content 204 will be divided into can be set or adjusted according to actual needs. For example, as shown in FIG. 2E, application icon A, application icon B, application icon E and application icon F are moved to the blank region as one part; at the same time, application icon I and application icon J are moved to another interface as another part.

Figure 2F:
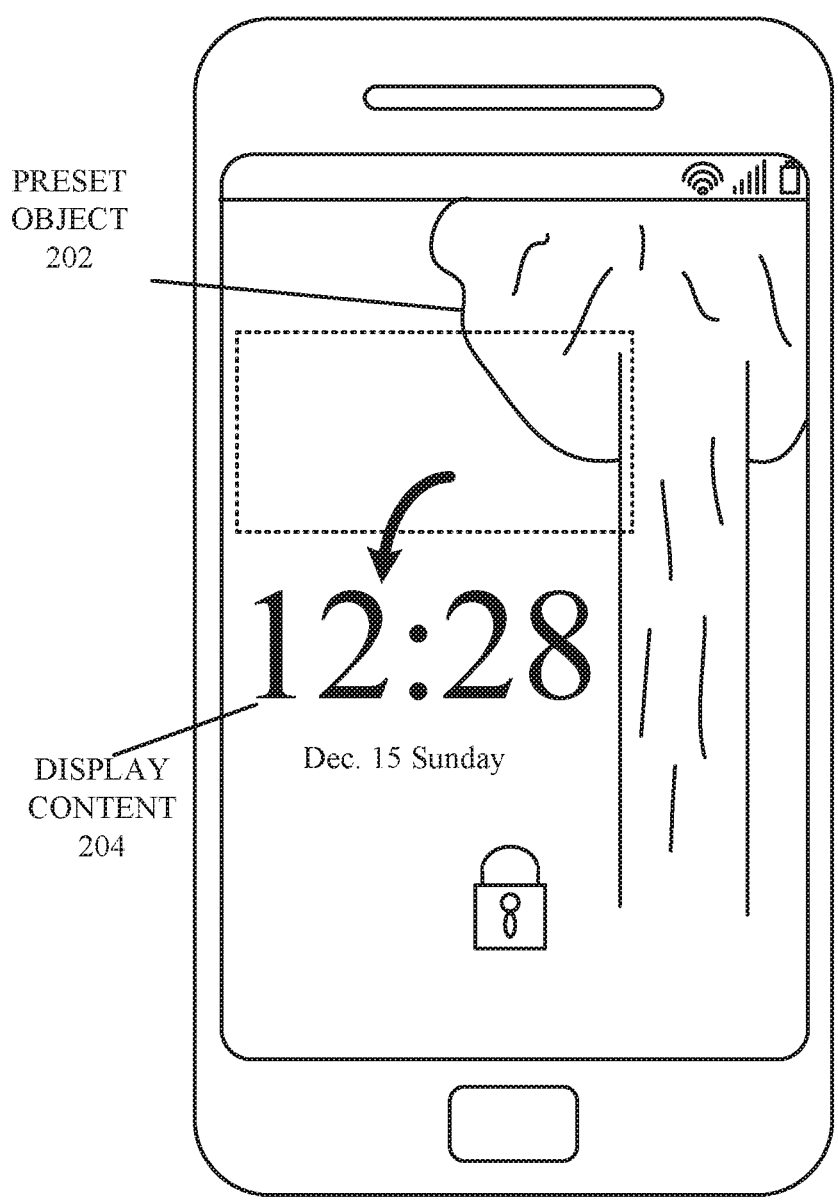

To better explain the technical solution of Implementation 1, FIG. 2F illustrates an application scenario corresponding to FIG. 2B, in which the process of moving the display content 204 is illustrated.

Specifically, as shown in FIG. 2F, on the lock-screen interface of the terminal, the display content 204 is the "time" plug-in, and the preset project 202 is "plant" in the background picture. By changing the display position of the display content 204, the display content 204 will not shield the preset object 202 after moving, which helps to achieve better display effects.

Case (3): if the blank region is not big enough for all of the display content, and if a combined region consists of the blank region and an occupied region of other display content in the vicinity of the blank region is big enough for all of the display content, the process of moving the display content out of the display region comprises: exchanging the display positions of the display content and the other display content, such that the display content is displayed in the combined region, and the other display content will not shield the display region.

For example, the display content 204 is a first widget in a first region and the display area thereof is S1; the other display content is a second widget (or application icon) in a second region and the display area thereof is S2; the area of the blank region of the screen interface is S3, wherein S1>S2 and S1≤S2+S3.

It is supposed that the preset object on the screen interface is shield by the first widget, and then the display positions of the first widget and the second widget can be exchanged. On one hand, since S1≤S2+S3, the first widget can be displayed in the combined region consists of the blank region and the second region, whereby eliminating the shielding of the preset object; on the other hand, since S1>S2, when the second widget is displayed in the first region, the shielding of the preset object can be avoided, whereby the preset object can be fully displayed.

Implementation 2

Preferably, if the preset object is comprised in the background picture and is shielded by the display content, the process of ensuring that there is no shielding comprises: adjusting the size and/or display mode of the display content.

Figure 2G:
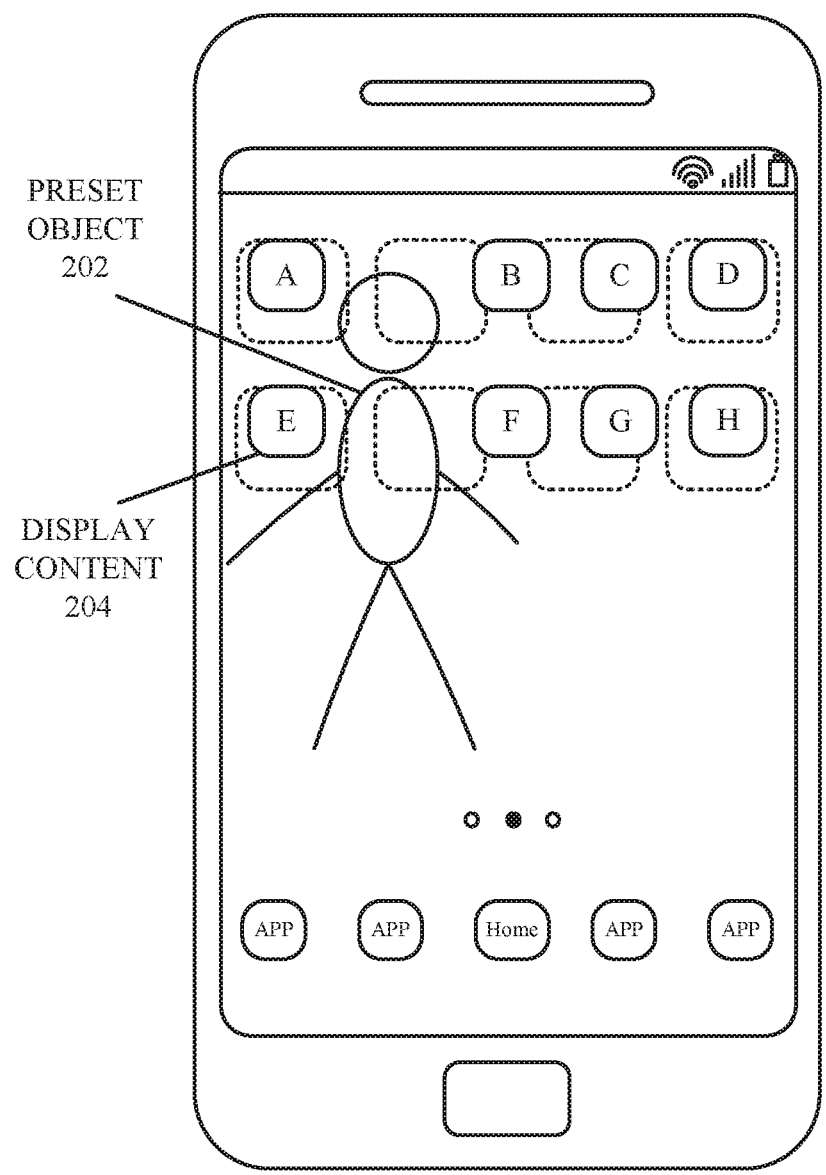

The adjustment of the size of the display content 204 can be achieved by reducing the display scale of application icons, such that the display content 204 will not shield the preset object 204 after reducing. Specifically, as shown in FIG. 2G, after the display scale of application icon A and application icon E is adjusted, the shielding of the preset object 202 is eliminated.

Sometimes, the combination of a variety of means will be needed to achieve a better adjustment effect. For example, in FIG. 2G, as to the application icon B, application icon C, application icon D, application icon F, application icon G, and application icon H, after adjusting the display scale thereof, five adjusted application icons should be displayed per line on the screen interface. But, since application icon B and application icon F may still shield the preset object 202 after adjusting, the display positions in the second column of each line shall be made vacant, that is to say, application icon B and application icon F will be moved out of the display region of the preset object 202 in order to avoid shielding.

Figure 2H:
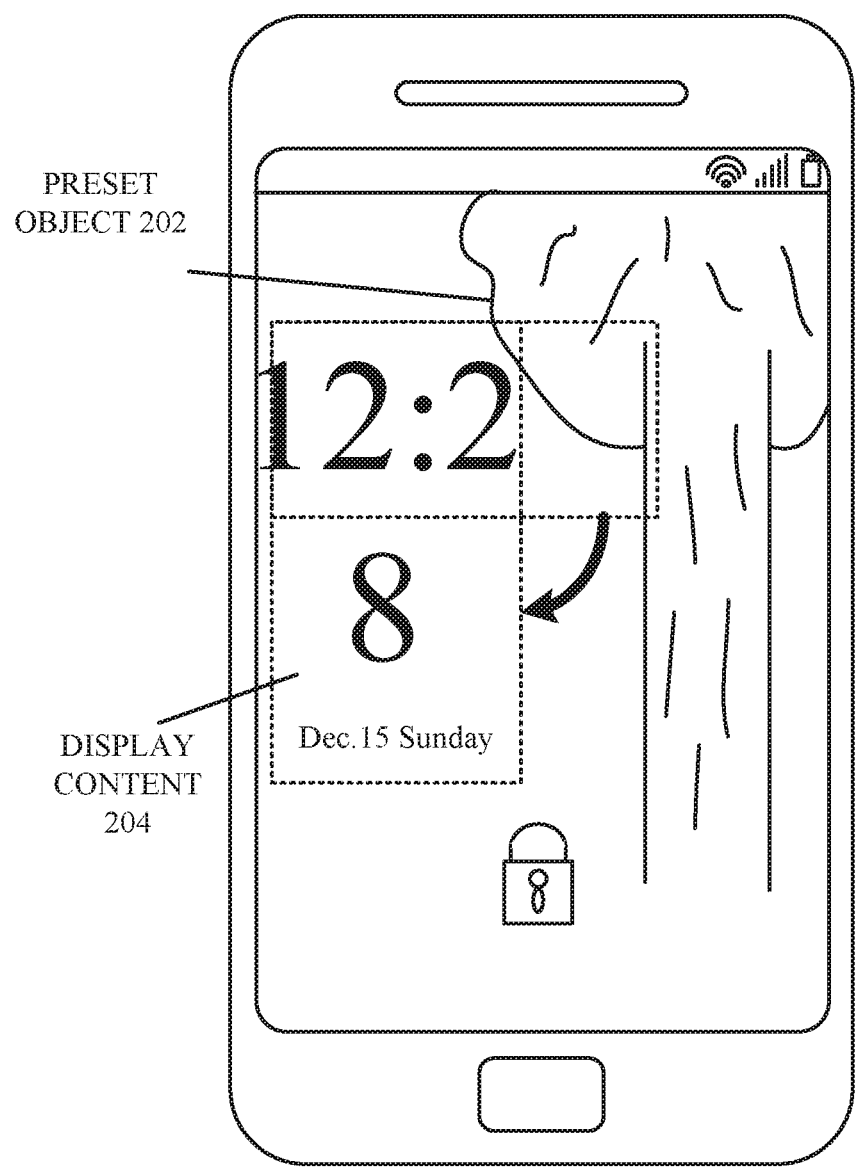

The adjustment of the display mode of the display content 204 can be achieved by adjusting the position, sequence, and the like of the individual elements contained in the display content 204 or by adjusting the arranging direction of the display content 204, so as to eliminate the shielding of the preset object 202 caused by it. As shown in FIG. 2H, as to the display content 204, that is, the "time" plug-in, as a specific implementation, the display mode thereof can be changed from "Horizontal display" to "Vertical display" to eliminate the shielding of preset object 202.

Implementation 3

Preferably, if the preset object is comprised in the background picture and is shielded by the display content, the process of ensuring that there is no shielding comprises: adjusting the display properties of the background picture.

Figure 2I:
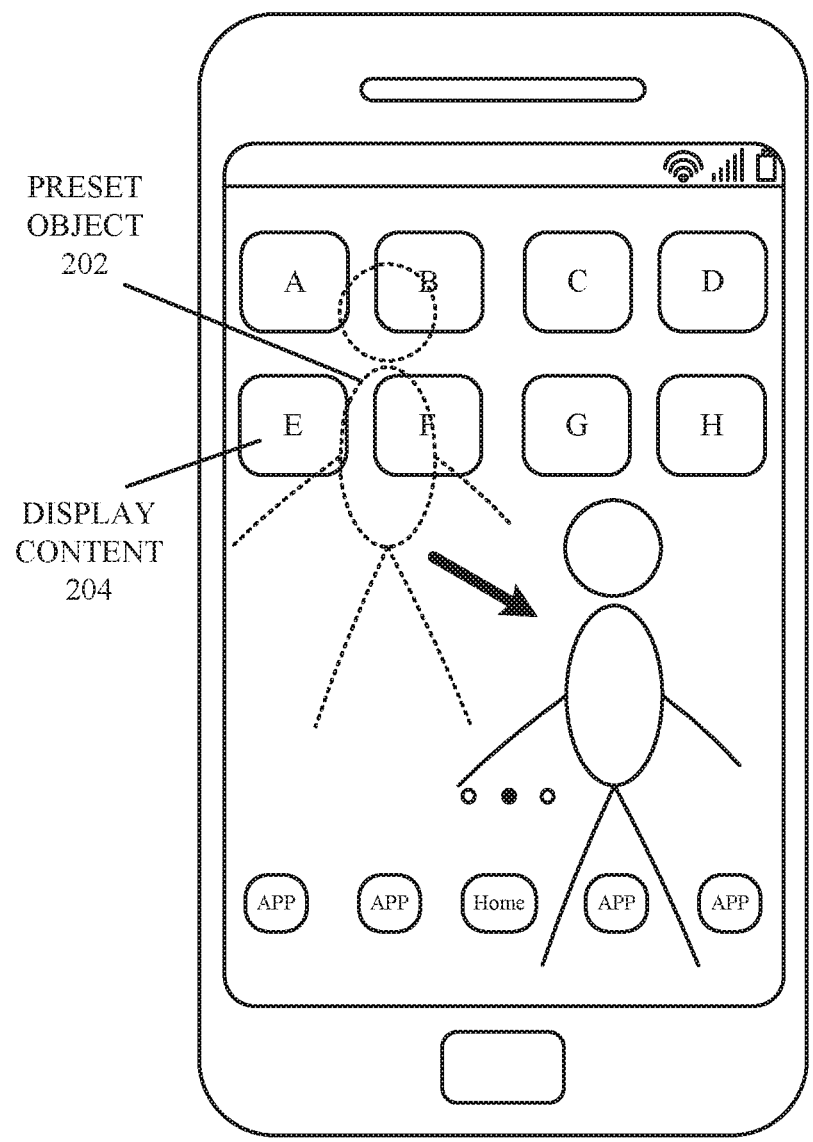
Figure 2J:
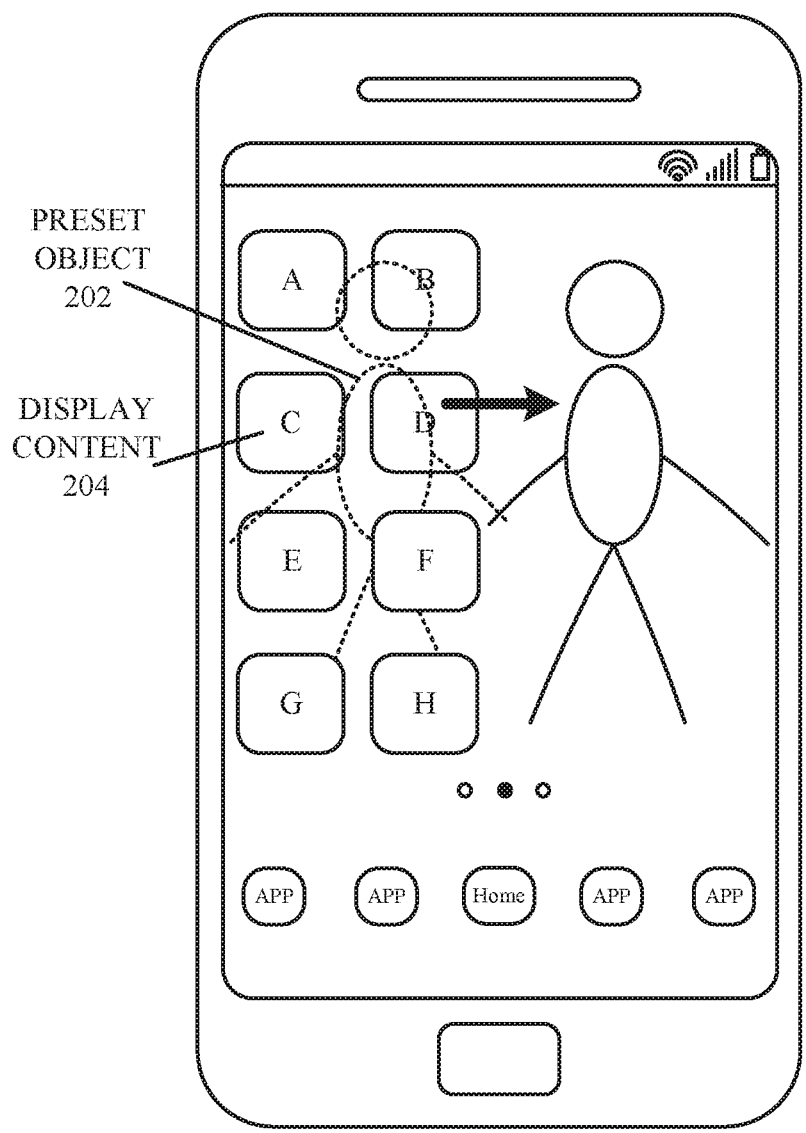

As shown in FIG. 2I and FIG. 2J, when the preset object 202 is shielded by the display content 204, the shielding of the preset object 202 can be eliminated by moving the preset object 202 from the upper left to the blank region on the lower right of the screen interface, or from the left to the blank region on the right of the screen interface.

While FIG. 2I and FIG. 2J both illustrate the situation where the shielding of the preset object 202 caused by the display content 204 is eliminated by adjusting the relative position relationship between the background picture and the screen interface, that is, by "moving", a person skilled in the art will understand that, the above-mentioned technical solution can also be achieved by other means, for example, the display properties of the background picture can be any of: display proportion, the relative position relationship between the background picture and the screen interface, arranging mode, and the like. The adjustment of the display properties of the background picture includes but is not limited to: scaling, moving, cropping, rotating, and the like.

It should be noted that:

First, various technical means described in Implementation 1 to Implementation 3 can be combined with each other according to actual needs. For example, the adjustment of size and the adjustment of position of the display content 204 as shown in FIG. 2G can be combined, and the shielding of the preset object 202 caused by the display content 204 can be eliminated through the combined technical solution of adjustment.

Second, in a specific implementation, the display region of the preset object 202 can be divided into multiple parts according to priority. In the situation where the blank region of the screen interface is relatively small or the user does not want to move the display content 204 to a folder or another interface, the shielding of the part with lower priority is allowed, but the shielding of the part with higher priority is not allowed. For example, the preset object 202 can comprise several priority levels, and the user can set thresholds used to divide "higher" or "lower" priority according to actual needs.

Figure 2K:
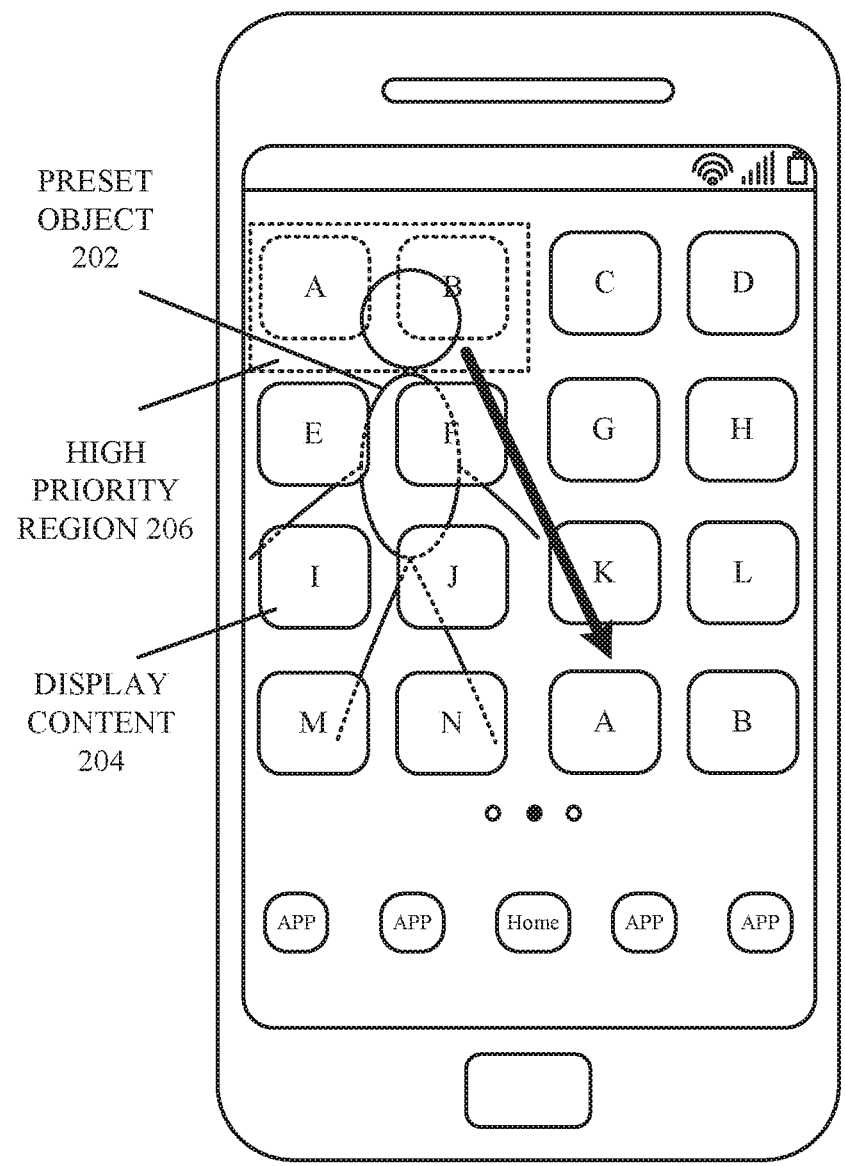

For example, in FIG. 2K, the "face" of the preset object 202 is set as a higher priority region 206 and no shielding is allowed, but the shielding of other parts other than the higher priority part is allowed. The shielding of the higher priority region 206 can be eliminated by moving application icon A and application icon B in the display content 204 to the blank region of the screen interface.

By dividing the preset object 202 into a higher priority region 206 and a lower priority region (not illustrated in figures) and setting the lower priority region to be a blank region, in the situation where the display positions on the screen interface are limited and/or the user does not want to move the display content to another interface, the area of "blank region" can be expanded to hold more display contents 204 so as to avoid too much changes to the display content 204.

Figure 3:
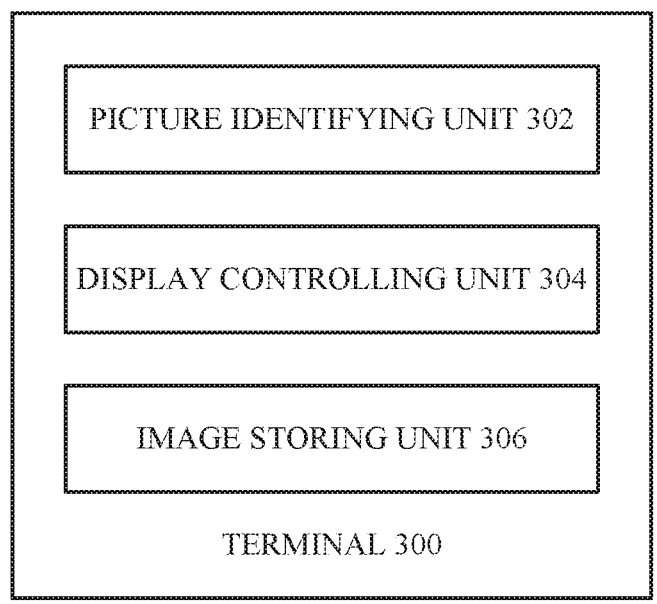
FIG. 3 is a block schematic diagram illustrating a terminal according to one implementation of the disclosure.

FIG. 3 is a block schematic diagram illustrating a terminal according to one implementation of the disclosure.

As shown in FIG. 3, a terminal 300 according to the implementation of the disclosure comprises: a picture identifying unit 302, configured to identify a background picture on a screen interface of the terminal 300 so as to determine whether the background picture comprises a preset object; a display controlling unit 304, configured to ensure that there is no display content shielding a display region of the preset object on the screen interface if the background picture comprises the preset object.

In this technical solution, by identifying whether the background picture comprises the preset object, the display position adjustment of the display content on the screen interface can only be performed when the preset object is comprised in the background picture, whereby reducing the number of display position adjustment as much as possible, which helps to reduce the power consumption of the terminal and save the processing resources.

If the background picture comprises the preset object, the position of the display content on the screen interface will be controlled or adjusted, such that the display region of the preset object will not be shielded and the preset object can be fully displayed on the screen interface, which helps to improve user experience.

Wherein, the preset object can be preset by the manufacturer or set by the user, and can be any display content (such as characters, scenery, text, and the like) of interest to the user in the background picture. On the other hand, there can be a lot of display content (such as application icons, widgets, window-based application interface, and the like) which may shield the preset object. In fact, any display content could shield the background picture and the position thereof can be adjusted by the terminal to avoid such shielding.

In the technical solution described above, preferably, the terminal 300 further comprises: an image storing unit 306, configured to pre-store a standard image of the preset object; wherein the picture identifying unit 302 is further configured to take an object comprised in the background picture as the preset object if it matches the standard image.

In the above-mentioned technical solution, by pre-storing the standard image of the preset object (such as the standard images of faces, trees, houses, and the like) in the terminal, the terminal can use the standard image to match the background picture by itself, and the object matched successfully in the background picture will be the preset object.

In the above-mentioned technical solution, preferably, the picture identifying unit 302 is further configured to: acquire the pre-stored characteristic parameter information of the preset object, and take an object comprised in the background picture as the preset object if it matches the standard image.

In the above-mentioned technical solution, the same kinds of objects may have the same characteristics, and the characteristic parameter information therefore refers to the corresponding characteristics of the preset object. For example, for "face", the characteristic parameter information may include: eye, nose, mouth, and the like, and the respective shape, color, size, location, and other information thereof.

Compared with the manner of storing the standard image directly, through the characteristic parameter information, the terminal can not only identify the same image as the standard image but also "learn" and "recognize" all the objects which have the above-mentioned characteristic parameter information. Still take "face" as an example, all faces, instead of a certain face, will be identified via the characteristic parameter information.

Of course, the characteristic parameter information can be applied to all kinds of preset objects, such as faces, scenery, and the like. The characteristic parameter information can be entered into the terminal directly by the user or the manufacturer; or, the image information of a specific preset object can be entered into the terminal, such that the terminal can summarize and store the corresponding characteristic parameter information via automatic "learning" of the image information. During the process of automatic "learning", the more the image information of the preset object pre-entered, the more accurate the characteristic parameter information will be summarized.

A person skilled in the art will understand that, there are many other ways to identify the preset object and therefore the above-mentioned technical solution is by no means for specific restrictions. In some cases, the user can select a region(s) of the background picture directly, and the region selected will be the preset object.

Preferably, in the above-mentioned technical solution, the display controlling unit 304 is further configured to: if the preset object is comprised in the background picture and is shielded by the display content, move the display content out of the display region.

In the technical solution, in the situation where the number of application icons or the background picture in the terminal changes, if the preset object is comprised in the background picture and is shielded by the display content on the screen interface, the shielding caused by the display content will be eliminated by moving it out of the display region of the preset object.

Preferably, in the above-mentioned technical solution, the display controlling unit 304 is further configured to perform any of the following: (1) if there is any blank region which is big enough for the display content other than the display region on the screen interface, moving the display content to the blank region; (2) if there is no blank region other than the display region on the screen interface, moving the display content to a specific folder already established on the screen interface; or, moving the display content to other terminal interfaces of the terminal; (3) if the blank region is not big enough for all of the display content, moving the display content to other terminal interfaces of the terminal; or, moving the display content to a specific folder already established on the screen interface; or, moving a part of the display content to the blank region, and moving the remain display content to other terminal interfaces of the terminal, the specific folder already established on the screen interface and/or a new folder on the screen interface; (4) if the blank region is not big enough for all of the display content and a combined region consists of the blank region and an occupied region of other display content in the vicinity of the blank region is big enough for all of the display content, exchanging the display positions of the display content and the other display content, such that the display content is displayed in the combined region, and the other display content will not shield the display region.

In the above-mentioned technical solution, "blank region" refers to regions other than the display region of the preset object, in which there is no other display content except the background picture. The method for moving the display content out of the display region can be determined according to the use of terminal interfaces and personal habits of the user. More specifically, by moving the display content to the blank region or the already established specific folder or the new folder, or, moving the display content directly to other terminal interfaces, the preset object can be fully displayed and the shielding thereof can be eliminated.

Preferably, in the above-mentioned technical solution, the display controlling unit 304 is further configured to: if the preset object is comprised in the background picture and is shielded by the display content, adjust the size and/or display mode of the display content.

In this technical solution, in some situations, such as where the preset object is shielded by a part of the display content, the shielding can be eliminated by adjusting the size of the display content. To be specific, the size proportion of the display content can be changed, for example, an icon of 2*2 can be changed to a small icon of 1*1 for displaying.

At the same time, the change of the display mode of the display content includes but is not limited to: the adjustment of the position, sequence, and the like. of the individual elements contained in the display content, or, the adjustment of the arranging direction of the display content; for example, adjusting the display mode of "Time" in a lock-screen state from "Horizontal display" to "Vertical display".

In the above-mentioned technical solution, preferably, the display controlling unit 304 is further configured to: if the preset object is comprised in the background picture and is shielded by the display content, adjust the display properties of the background picture.

It can be seen that, in this technical solution, if the preset object is shielded by the display content, the shielding can also be eliminated by adjusting the display properties of the background picture. Wherein the display properties of the background picture can be any of: display proportion, the relative position relationship between the background picture and the screen interface, arranging mode, and the like. The adjustment of the display properties of the background picture includes but is not limited to: scaling, moving, cropping, rotating, and the like.

In the above-mentioned technical solution, preferably, the display region comprises a high priority region and a low priority region; and the display controlling unit 304 is further configured to: if the preset object is comprised in the background picture and is shielded by the display content, set the low priority region as a blank region, such that all of the blank regions will be enough for the display content after setting.

In this technical solution, by dividing the display region of the preset objects into the high priority region and the low priority region and setting the latter as the blank region, in the situation where the display positions on the screen interface are limited and it is undesirable to move the display content to other interfaces, the area of "blank region" can be expanded to hold more display contents so as to avoid too much changes to the display content.

Figure 4:
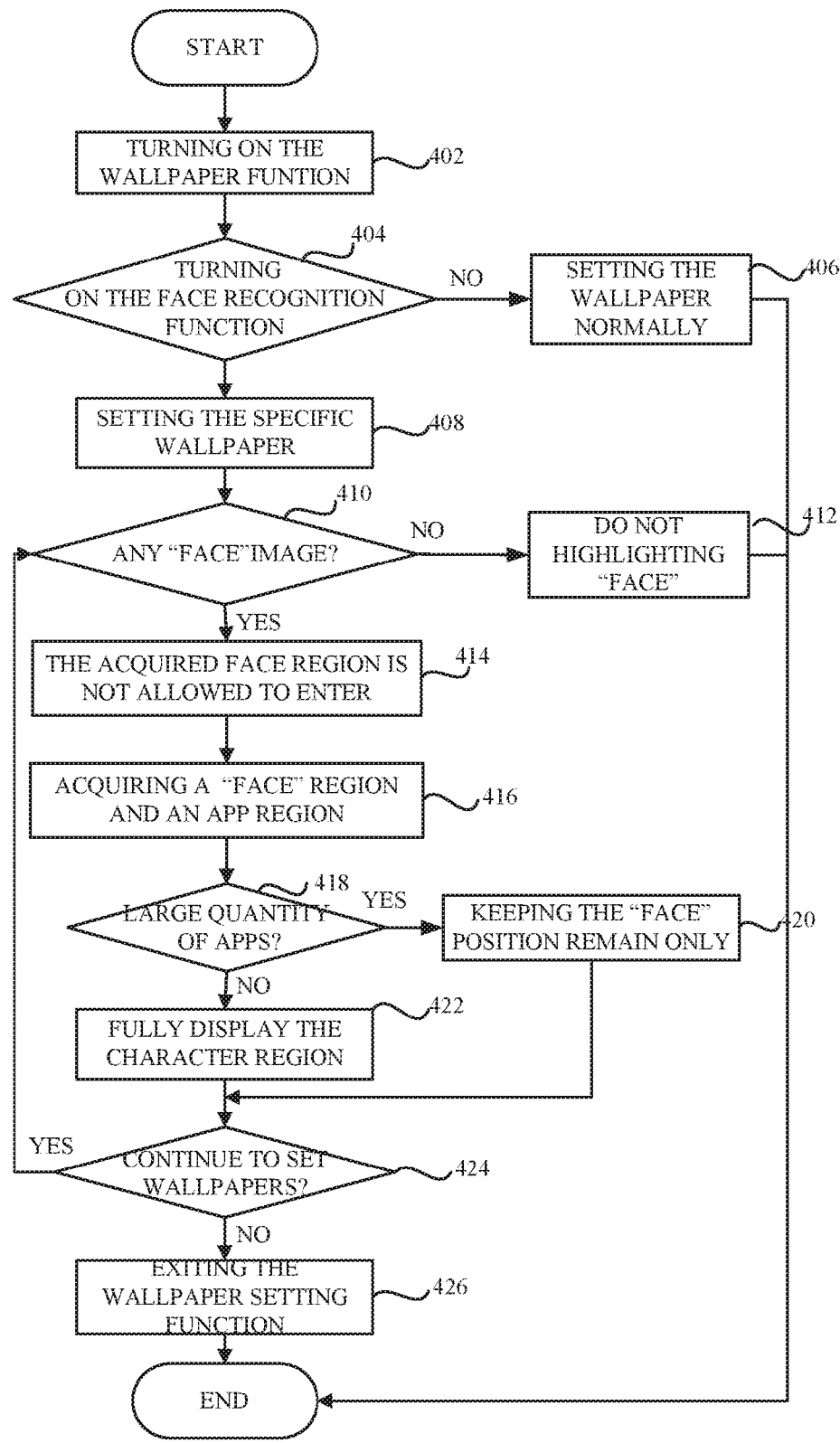
FIG. 4 is a schematic flowchart illustrating a method of controlling terminal display according to one implementation of the disclosure.

FIG. 4 is a schematic flowchart illustrating a method of controlling terminal display according to one implementation of the disclosure. As shown in FIG. 4, the method comprises Step 402-Step 426:

Step 402: turning on the wallpaper setting function of a terminal through wallpaper function setting options or third party applications in the terminal.

Step 404: determining whether to turn on the face recognition function; if yes, proceed to Step 408; otherwise, proceed to Step 406; wherein "face" is used as an example of the preset object so as to illustrate how to avoid shielding "face" in the wallpaper.

Step 406, setting the wallpaper normally, wherein application icons and widgets and the like may shield the background picture (that is, the wall paper).

Step 408, setting the wallpaper, which may be one or more of standby wallpaper, main interface wallpaper, or desktop wallpaper, etc.

Step 410, determining whether this is any character portrait (that is, "face") in the wallpaper via face recognition function; if yes, proceed to Step 414; otherwise, proceed to Step 412.

Step 412, do not acquiring a face region within the wallpaper, and there is no need to highlighting or un-shielding "face".

Step 414, acquiring the face region within the wallpaper, and the acquired face region is not allowed to enter.

Step 416, determining a relative position relationship between the acquired "face" region and a region of application icons.

Step 418, determining whether there is a large or small quantity of application icons; if there is large quantity of application icons, proceed to Step 420; otherwise, proceed to Step 422.

Step 420, avoiding the shielding of the "face" region caused by the application icons so as to display the "face" region prominently; as to other positions in the wallpaper other than the "face", application icons can be arranged arbitrarily thereon and shielding is allowable.

Step 422, fully display the character region (for example, comprising the "face" and body parts of a character) and the shielding thereof caused by the application icons is avoided.

Step 424, determining whether to continue to set wallpapers; if yes, return to Step 410; otherwise, proceed to Step 426.

Step 426, exiting the wallpaper setting function.

The technical solutions of the present disclosure have been described in detail with refer to the figures. Taking into account that the contents in the background picture is easily to be shielded by the application icons and widgets etc., it is provided a display method and a terminal in the present disclosure, which can avoid the shielding of the preset object of the background picture caused by the display contents of the terminal, whereby the preset object can be fully displayed, which helps to improve user experience.

Figure 5:
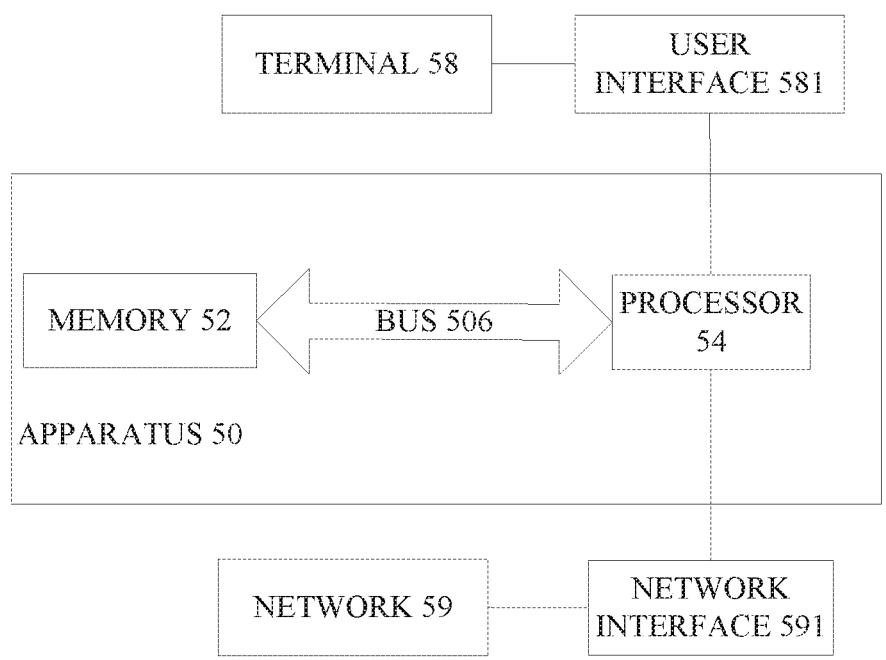
FIG. 5 is a block schematic diagram illustrating an apparatus according to one implementation of the disclosure.

According to another implementation of the disclosure, it is provided an apparatus; FIG. 5 is a block schematic diagram illustrating the apparatus. As shown in FIG. 5, the apparatus 50 comprise a memory 52 and at least one processor 54; wherein the memory can be any of ROM, RAM, CD-RAM, or any other removable storage medium, and is configured to store computer-readable program code; the processor 54 is connected to the memory via wired or wireless connections (such as via a bus 56), and is configured to invoke the computer-readable program code to execute the following: identifying a background picture on a screen interface of a terminal; and when the background picture comprises a preset object, ensuring that there is no display content shielding a display region of the preset object on the screen interface. In addition, as can be seen from FIG. 5, the processor 54 can but not necessarily connect to a terminal 58 through a user interface 581 or to a network 59 through a network interface 591. Alternatively, the processor 54 can also connect to the outside terminal or network in a wireless manner.

According to another implementation of the disclosure, it is provided a program product stored in a non-volatile machine readable medium for terminal control. The program product includes machine executable instructions, when executed by a computer system, causing the system to execute the following: identifying a background picture on a screen interface of a terminal; and when the background picture comprises a preset object, ensuring that there is no display content shielding a display region of the preset object on the screen interface.

In accordance with a further aspect of the disclosure, it is further provided a non-volatile machine readable medium storing a program product for terminal control. The program product includes machine executable instructions, when executed by a computer system (such as a system comprises a processor and a memory), causing the system to execute the following: identifying a background picture on a screen interface of a terminal; and when the background picture comprises a preset object, ensuring that there is no display content shielding a display region of the preset object on the screen interface.

According to a further aspect of the disclosure, it is further provided a machine-readable program, configured to cause the machine to execute any of the display methods described in the abovementioned technical solutions.

According to a further aspect of the disclosure, it is further provided a storage medium storing a machine-readable program. The machine-readable program is configured to cause the machine to execute any of the display methods described in the abovementioned technical solutions.

The foregoing descriptions are merely preferred implementations of the present disclosure, rather than limiting the present disclosure. Various modifications and alterations may be made to the present disclosure for those skilled in the art. Any modification, equivalent substitution, improvement or the like made within the spirit and principle of the present disclosure shall fall into the protection scope of the present disclosure.

What is claimed is:

1. A display method, comprising:
   identifying a background picture on a screen interface of a terminal;
   based on a determination that the background picture comprises a preset object, determining whether any display content shields a display region of the preset object on the screen interface;
   based on a determination that the display region of the preset object is shielded by the display content, determining whether a blank region other than the display region is big enough for the display content and whether a combined region comprising the blank region and an occupied region of other display content in a vicinity of the blank region is big enough for the display content; and
   based on a determination that the blank region is not big enough for the display content and a determination that the combined region is big enough for the display content, exchanging display positions of the display content and the other display content, wherein the display content is displayed in the combined region and the other display content does not shield the display region.

2. The display method according to claim 1, further comprising:
   pre-storing a standard image of the preset object in the terminal; and
   wherein the identifying the background picture on the screen interface of the terminal comprises taking an object in the background picture as the preset object when the object matches the standard image.

3. The display method according to claim 2, further comprising:
   based on the determination that the display region of the preset object is shielded by the display content, moving the display content out of the display region.

4. The display method according to claim 2, further comprising:
   based on the determination that the display region of the preset object is shielded by the display content, adjusting a size and display mode of the display content.

5. The display method according to claim 1, wherein the identifying the background picture on the screen interface of the terminal comprises:
   receiving a pre-stored characteristic parameter information of the preset object; and
   based on a determination that an object in the background picture matches the pre-stored characteristic parameter information, taking the object in the background picture as the preset object.

6. The display method according to claim 5, further comprising:
   based on the determination that the display region of the preset object is shielded by the display content, moving the display content out of the display region.

7. The display method according to claim 5, further comprising:
   based on the determination that the display region of the preset object is shielded by the display content, adjusting a size and display mode of the display content.

8. The display method according to claim 1, further comprising:

based on the determination that the display region of the preset object is shielded by the display content, moving the display content out of the display region.

9. The display method according to claim 8, further comprising:
based on the determination that the blank region is not big enough for all of the display content, performing at least one of:
moving the display content to other terminal interfaces of the terminal;
moving the display content to a specific folder already established on the screen interface; or
moving a part of the display content to the blank region and remaining display content to the other terminal interfaces of the terminal, wherein the other terminal interfaces of the terminal is the specific folder already established on the screen interface, or a new folder on the screen interface.

10. The display method according to claim 1, further comprising:
based on the determination that the display region of the preset object is shielded by the display content, adjusting a size and display mode of the display content.

11. A terminal, comprising:
a memory configured to store program codes; and
at least one processor configured to execute the program codes stored in the memory to:
identify a background picture on a screen interface of a terminal;
based on a determination that the background picture comprises a preset object, determine whether any display content shields a display region of the preset object on the screen interface;
based on a determination that the display region of the preset object is shielded by the display content, determine whether a blank region other than the display region is big enough for the display content and whether a combined region comprising the blank region and an occupied region of other display content in a vicinity of the blank region is big enough for the display content; and
based on a determination that the blank region is not big enough for the display content and a determination that the combined region is big enough for the display content, exchange display positions of the display content and the other display content, wherein the display content is displayed in the combined region and the other display content does not shield the display region.

12. The terminal according to claim 11, wherein the program codes stored in the memory are further configured to:
pre-store a standard image of the preset object; and
take the object in the background picture as the preset object when the object matches the standard image.

13. The terminal according to claim 12, wherein the program codes stored in the memory are further configured to:
based on the determination that the display region of the preset object is shielded by the display content, move the display content out of the display region.

14. The terminal according to claim 12, wherein the program codes stored in the memory are further configured to:
based on the determination that the display region of the preset object is shielded by the display content, adjust a size and display mode of the display content.

15. The terminal according to claim 11, wherein the program codes stored in the memory are further configured to:
receive pre-stored characteristic parameter information of the preset object; and
based on a determination that an object in the background picture matches the pre-stored characteristic parameter information, take the object in the background pictured as the preset object.

16. The terminal according to claim 15, wherein the program codes stored in the memory are further configured to:
based on the determination that the display region of the preset object is shielded by the display content, move the display content out of the display region.

17. The terminal according to claim 11, wherein the program codes stored in the memory are further configured to:
based on the determination that the display region of the preset object is shielded by the display content, move the display content out of the display region.

18. The terminal according to claim 17, wherein the program codes stored in the memory are further configured to:
based on the determination that the blank region is not big enough for the display content, perform at least one of:
moving the display content to other terminal interfaces of the terminal;
moving the display content to a specific folder already established on the screen interface; or
moving a part of the display content to the blank region and remaining display content to the other terminal interfaces of the terminal, wherein the other terminal interfaces of the terminal is the specific folder already established on the screen interface, or a new folder on the screen interface.

19. The terminal according to claim 11, wherein the program codes stored in the memory are further configured to:
based on the determination that the display region of the preset object is shielded by the display content, adjust a size and display mode of the display content.

20. A non-transitory computer-readable storage medium, comprising executable instructions that, when executed by a processor, facilitate performance of operations, comprising:
identify a background picture on a screen interface of a terminal;
based on a determination that the background picture comprises a preset object, determine whether any display content shields a display region of the preset object on the screen interface;
based on a determination that the display region of the preset object is shielded by the display content, determine whether a blank region other than the display region is big enough for the display content and whether a combined region comprising the blank region and an occupied region of other display content in a vicinity of the blank region is big enough for the display content; and
based on a determination that the blank region is not big enough for the display content and a determination that the combined region is big enough for the display content, exchange display positions of the display content and the other display content, wherein the display content is displayed in the combined region and the other display content does not shield the display region.

* * * * *